(12) United States Patent
Nagel et al.

(10) Patent No.: US 10,591,798 B1
(45) Date of Patent: Mar. 17, 2020

(54) DYNAMIC TENANCY

(71) Applicant: Kinestral Technologies, Inc., South San Francisco, CA (US)

(72) Inventors: Paul Nagel, South San Francisco, CA (US); Wally Barnum, South San Francisco, CA (US); Jason Litzinger, South San Francisco, CA (US); William O'Dell, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 170 days.

(21) Appl. No.: 15/820,884

(22) Filed: Nov. 22, 2017

Related U.S. Application Data

(60) Provisional application No. 62/426,160, filed on Jan. 23, 2016, provisional application No. 62/511,269, filed on May 25, 2017.

(51) Int. Cl.
*G02F 1/163* (2006.01)
*E06B 9/24* (2006.01)
*G05B 15/02* (2006.01)

(52) U.S. Cl.
CPC ............... *G02F 1/163* (2013.01); *E06B 9/24* (2013.01); *G05B 15/02* (2013.01); *E06B 2009/2464* (2013.01); *G02F 2203/01* (2013.01)

(58) Field of Classification Search
CPC ............................. G02F 1/163; G02F 2203/01
See application file for complete search history.

(56) References Cited

U.S. PATENT DOCUMENTS

2016/0154290 A1* 6/2016 Brown ................ H04L 12/4625
359/275
2017/0185057 A1* 6/2017 Ashdown ............. G05B 19/042

* cited by examiner

*Primary Examiner* — Joseph P Martinez
(74) *Attorney, Agent, or Firm* — Womble Bond Dickinson (US) LLP (57) ABSTRACT

A method of controlling smart windows with dynamic tenancy, performed by a control system is provided. The method includes coupling a control system having a plurality of smart windows each having one or more electrochromic devices, to a plurality of remote devices, and managing, in the control system, configurable smart window groups each having in membership one or more of the plurality of smart windows. The method includes managing, in the control system, configurable user groups each having in membership one or more of a plurality of users in association with the smart window groups, and controlling transmissivity of the electrochromic devices of the plurality of smart windows in accordance with the configurable smart window groups, the configurable user groups and the plurality of remote devices.

20 Claims, 6 Drawing Sheets

DYNAMIC TENANCY

BACKGROUND

Buildings with electrochromic windows may change tenancy over time. Users of the electrochromic windows often have different ideas or preferences from one another, regarding settings of tinting or transmissivity of the electrochromic windows. Having to seek the owner of the building or the electrochromic window system, to make changes or acquire permission to make changes in settings of tinting or transmissivity of the electrochromic windows is time-consuming and inconvenient. Presently known building management systems (BMS) do not have a category for ready inclusion of electrochromic windows in their control systems. Therefore, there is a need in the art for a solution which overcomes the drawbacks described above.

SUMMARY

In some embodiments, a method of controlling smart windows with dynamic tenancy, performed by a control system is provided. The method includes coupling a control system having a plurality of smart windows each having one or more electrochromic devices, to a plurality of remote devices, and managing, in the control system, configurable smart window groups each having in membership one or more of the plurality of smart windows. The method includes managing, in the control system, configurable user groups each having in membership one or more of a plurality of users in association with the smart window groups, and controlling transmissivity of the electrochromic devices of the plurality of smart windows in accordance with the configurable smart window groups, the configurable user groups and the plurality of remote devices.

In some embodiments, a smart window system with dynamic tenancy is provided. The system includes a plurality of smart windows each having one or more electrochromic devices, and a control system configurable to couple to the plurality of smart windows and to couple to a plurality of remote devices, and having at least one processor. The control system is configurable to manage configurable smart window groups each having one or more smart windows and configurable user groups each having one or more users, associated with the smart window groups. The control system is configurable to control transmissivity of the electrochromic devices of the plurality of smart windows in accordance with the configurable smart window groups, the configurable user groups and direction from the plurality of remote devices.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
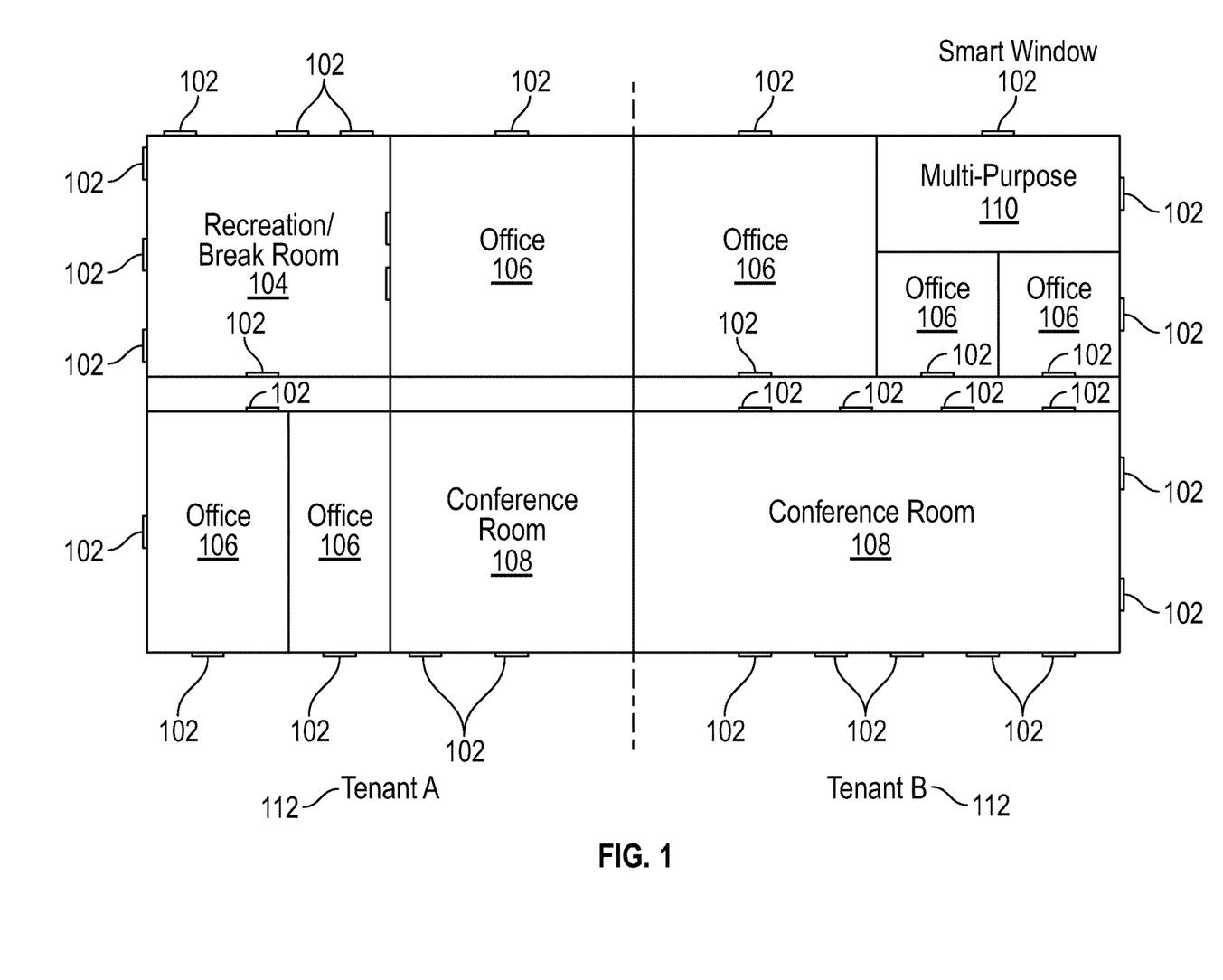
FIG. 1 is a floorplan for a multitenant building that has smart windows.

FIG. 1 is a floorplan for a multitenant building that has smart windows 102. Each smart window 102 has an electrochromic device, for example one or more panes of electrochromic glass (or other material), controllable for tint or transmissivity of light. This is but one example, for illustration of issues in and capabilities for a smart window system, and further floorplans for multitenant buildings of one or multiple stories are readily devised. The floorplan shows rooms for two tenants 112 of the building, and gives examples of rooms by categories. There is a recreation or break room 104, multiple offices 106, multiple conference rooms 108, and a multi-purpose room 110, each with one or more smart windows 102. Some of the rooms have interior smart windows 102, for example facing a hallway or another room. It is desired that individual users, and groups of users have specified permissions for operating smart windows 102 and groups of smart windows 102 in this multitenant building, and that the smart window system manages the smart window groups, the user groups, and group and individual permissions for the users, as well as the operation of the smart windows 102 in accordance with these permissions. It is further desired that the smart window groups and user groups be reconfigurable, so that dynamic tenancy (i.e., changes in tenants 112) is supported by the smart window system. It is still further desired that installation and usage of the smart windows 102 and smart window system be supported by an installation application (i.e., app).

Figure 2A:
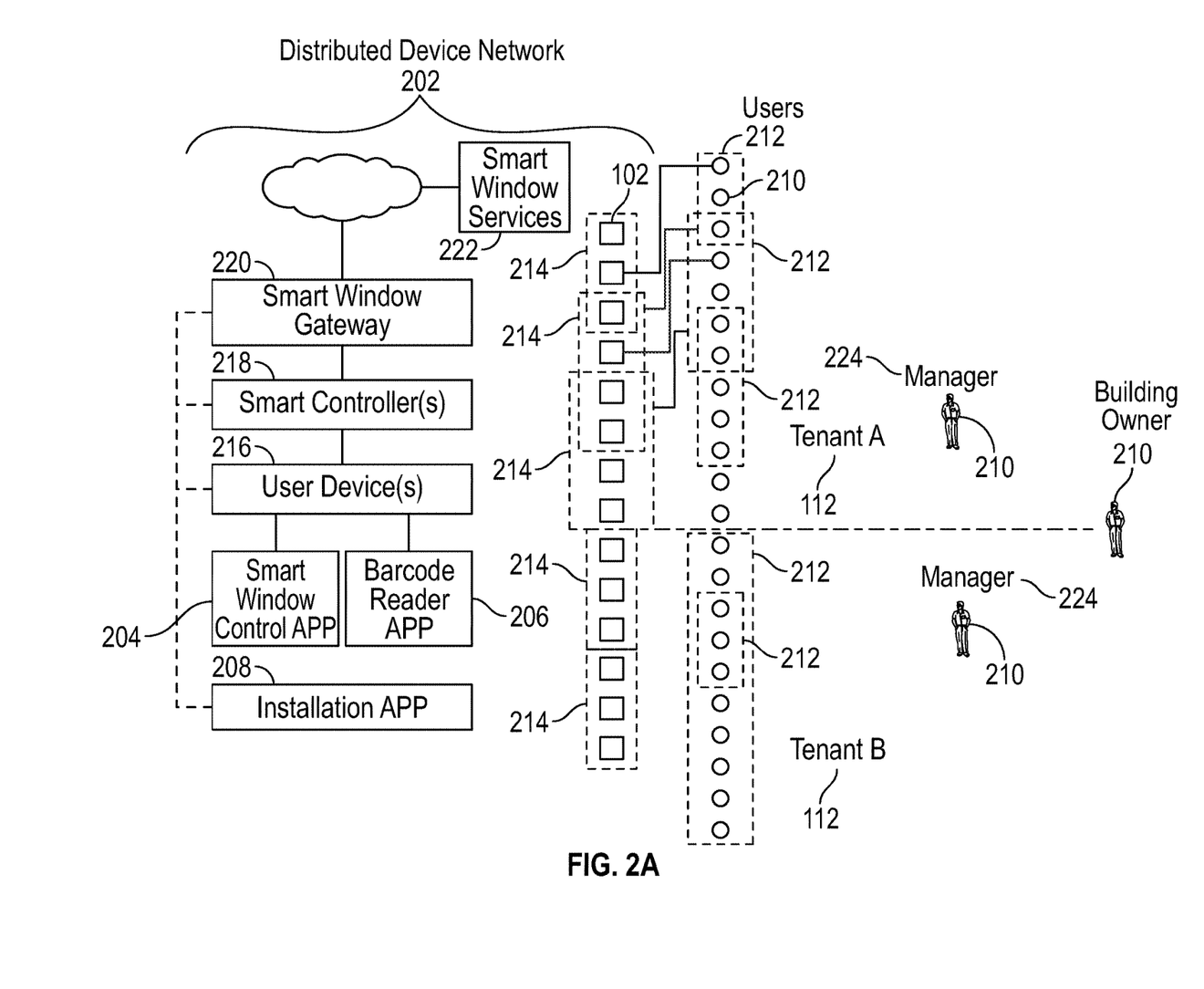
FIG. 2A is a system diagram of a distributed device network with smart windows, a smart window control application, a barcode reader application, and an installation application, showing association of users in groups to smart windows in groups, in reconfigurable arrangement for dynamic tenancy.

FIG. 2A is a system diagram of a distributed device network 202 with smart windows 102, a smart window control application 204, a barcode reader application 206, and an installation application 208, showing association of users 210 in user groups 212 to smart windows 102 in smart window groups 214, in reconfigurable arrangement for dynamic tenancy. Control and information are distributed throughout multiple levels of controllers in the distributed device network 202, with individual components of the control system able to operate the smart windows 102 in cooperation with other components, and also under failure or absence of communication with other components in various circumstances, e.g., network outage. In one embodiment, the user devices 216, which could be smart phones or other telephonic or mobile communication devices, remote control devices, personal or portable computers, tablets, keypads, touchpads, voice control units, wireless devices, infrared devices, wired devices, voice control units, sound control units, and network connectable devices, etc., each (or at least some) have a smart window control application 204 and a barcode reader application 206. An installation application 208 could be present in a user device 216 and/or in one or more of the smart controllers 218 or the smart window gateway 220. During installation of the smart window system, the barcode reader application 206 reads a barcode on each smart window 102 and other components in the smart window system. In some versions, the user device 216 geo-tags the smart window 102, e.g., by recording GPS (Global positioning system) data in association with the barcode or other identification of the individual smart window 102 or other component in the smart window system. This information is recorded in the distributed device network 202, for example in the smart controllers 218, optionally also in the smart window gateway 220 and/or the smart window services 222.

In further embodiments, RFID tags are embedded into the smart windows 102, e.g., in the integrated glazing unit (IGU) assemblies, or Bluetooth beacons are embedded in the smart windows 102. RFID tags could be active or passive (e.g., using electromagnetic energy from a smart phone or scanning device to energize). A Bluetooth beacon could derive power from the window or the driver. These embodiments allow an app (application, e.g. on a user device) to identify which windows are nearby, identifying windows by name to an installer or user.

The smart windows 102 are organized in groups 214, for example by room or multiple rooms, by side of the building, by tenancy regions, by building story or stories, by interior or exterior location, or in further groups or categories of groups as readily devised. Users 210 are organized in groups 212, for example by association with rooms, job function or category, management hierarchy, work schedules, or in further groups or categories of groups as readily devised. Groups 214 of smart windows 102 are allowed to overlap (e.g., groups of office windows could overlap with a group of outside facing windows on the south side of the building). Groups 212 of users 210 are allowed to overlap (e.g., users of specified offices, users of a conference room, users of the recreation/break room).

Figure 2B:
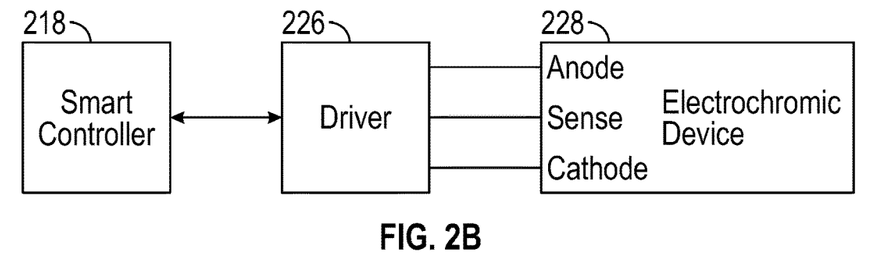
FIG. 2B is a diagram of a smart controller from FIG. 2A, coupled to a driver that drives an electrochromic device.

FIG. 2B is a diagram of a smart controller 218 from FIG. 2A, coupled to a driver 226 that drives an electrochromic device 228. Many design variations are possible, such as the smart controller 218 and driver 226 being integrated as a component, and separate from the electrochromic device 228, the driver 226 being integrated with the electrochromic device 228, or a portion of the driver 226 being integrated with the electrochromic device 228 or with the smart controller 218. In the embodiment shown in FIG. 2B, the driver pushes charge into the anode or pulls charge from the anode, and senses a sense voltage at a sense terminal of the electrochromic device 228, with charge being returned or drawn through the cathode. Further embodiments of electrochromic devices and drivers could reverse the anode and cathode connections or operation, drive both anode and cathode (e.g., in opposite directions of current flow), omit the sense voltage terminal, or have multiple sense voltage terminals. Still further embodiments could have a charge sequestration terminal on the electrochromic device 228.

Figure 2C:
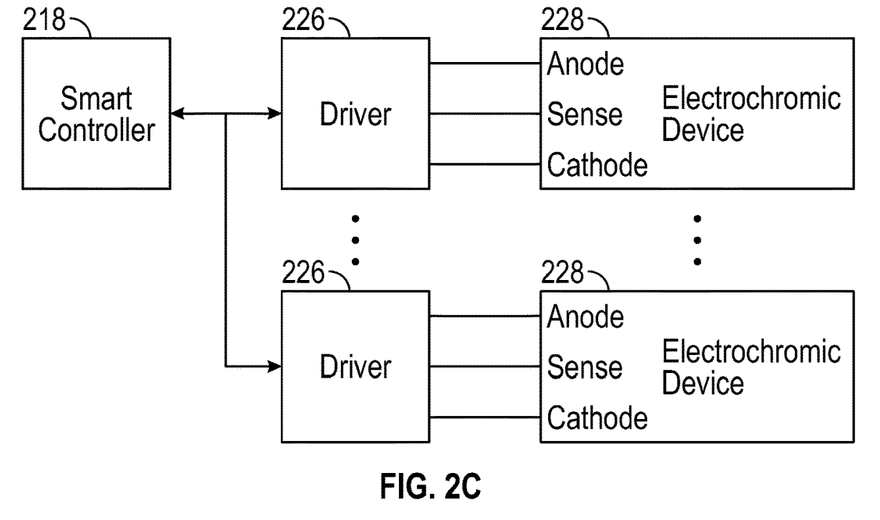
FIG. 2C is a diagram of a smart controller from FIG. 2A, coupled to multiple drivers each driving an electrochromic device.

FIG. 2C is a diagram of a smart controller 218 from FIG. 2A, coupled to multiple drivers 226 each driving an electrochromic device 228. Each driver 226 could be similar or identical to the driver 226 shown in FIG. 2B. Through communication to the drivers 226, e.g. by wireless network, wired network or bus, the smart controller 218 can control each of the electrochromic devices 228 independently of the other(s), or control two or more electrochromic devices 228 as a group, possibly with other electrochromic devices 228 controlled by other drivers 226 and/or smart controllers 218.

Figure 2D:
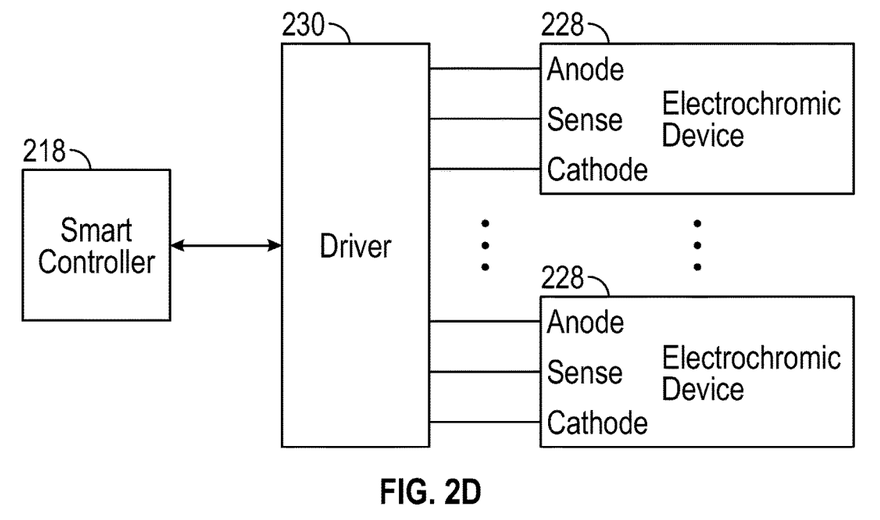
FIG. 2D is a diagram of a smart controller from FIG. 2A, coupled to a driver that drives multiple electrochromic devices.

FIG. 2D is a diagram of a smart controller 218 from FIG. 2A, coupled to a driver 230 that drives multiple electrochromic devices 228. Variations discussed above with reference to FIGS. 2B and 2C apply here and generally throughout embodiments of the smart window system. For example, the driver 230 could be made from multiple drivers 226 integrated into a single driver 230, and have similar control of each electrochromic device 228 independently of (or grouped with) other electrochromic devices 228.

Figure 2E:
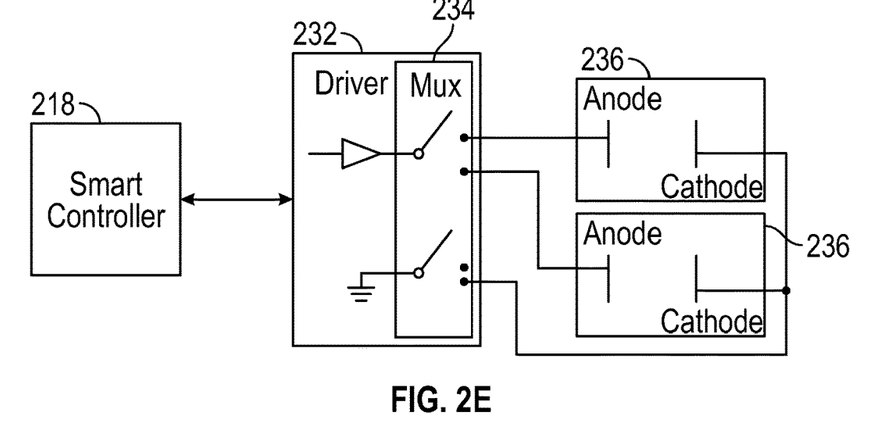
FIG. 2E is a diagram of a smart controller from FIG. 2A, coupled to a driver that is multiplexed to drive multiple electrochromic devices.

FIG. 2E is a diagram of a smart controller 218 from FIG. 2A, coupled to a driver 232 that is multiplexed to drive multiple electrochromic devices 236. A multiplexer 234, integrated into the driver 232, selects one of the anodes from one of the electrochromic devices 236 at any given moment, to drive charge into or pull charge from that anode. In this embodiment, to reduce the number of wires that need installation between the driver 232 and the electrochromic devices 236, the cathodes of the electrochromic devices 236 are connected together and only one wire for the cathodes is run back to the driver 232. Alternatively, the cathodes could be coupled permanently to ground, e.g. at the driver 232 without a switch, or elsewhere. As a further alternative, the cathodes and anodes could be swapped. By appropriate use of timesharing or time multiplexing, the driver 232 can drive one electrochromic device 236 for an extended period of time, to bleach or tint just that electrochromic device 236, or alternate between driving each of the two (or more, in further embodiments) electrochromic devices 236 more rapidly so as to approximate simultaneous drive and tinting or bleaching of both electrochromic devices 236. Varying the duty cycle of the switching of the multiplexer 234 or signaling from the driver 232, the driver 232 can tint or bleach one of the electrochromic devices 236 more slowly, rapidly, or to a different level than the other. Or, the driver 232 could drive two (or more) different sized (or different charge capacity or chemistry) electrochromic devices 228, compensating for different charge transfer requirements. The same is true of versions shown FIGS. 2C, 2D and 2F. These electrochromic devices 236 are shown without sense terminals, but could have sense terminals in variations.

Figure 2F:
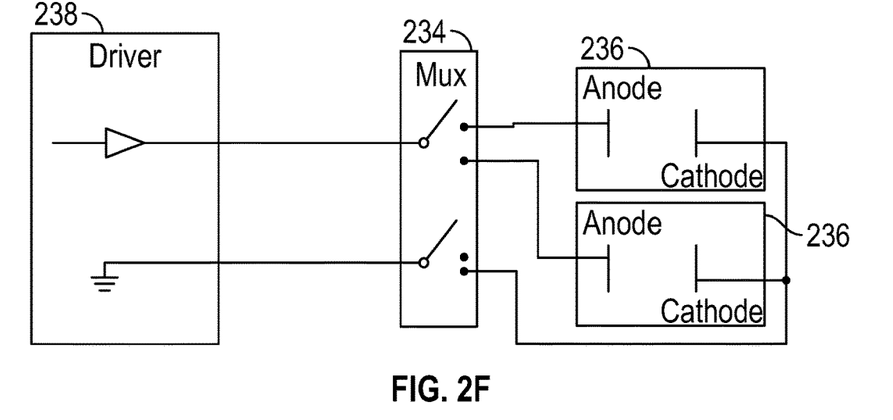
FIG. 2F is a diagram of a variation of the driver from FIG. 2E, with the multiplexer external to the driver and adjacent to or integrated with the electrochromic devices.

FIG. 2F is a diagram of a variation of the driver 232 from FIG. 2E, with the multiplexer 234 external to the driver 238 and adjacent to or integrated with the electrochromic devices 236. Otherwise, connections, variations and capabilities are similar to those shown in FIG. 2E. The arrangement shown in FIG. 2F has fewer wires between the driver 238 and other assemblies.

Figure 2G:
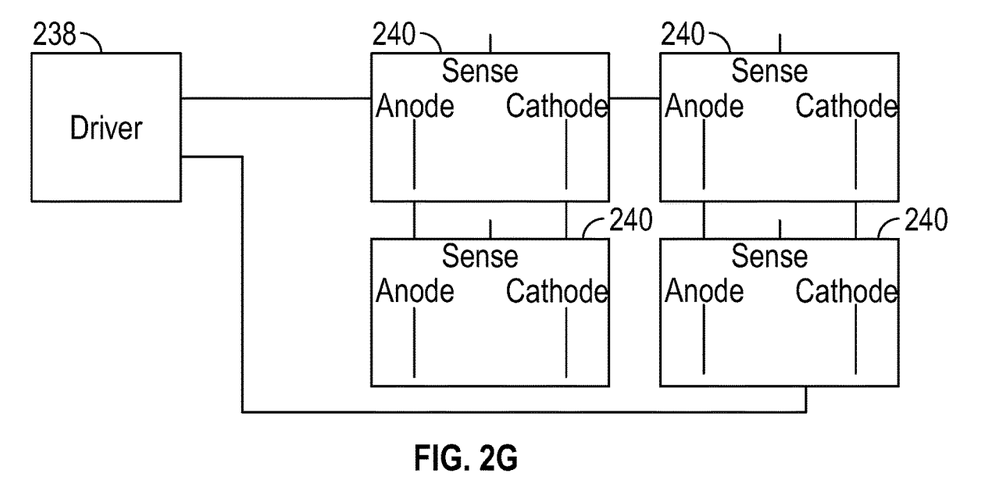
FIG. 2G is a diagram of a driver coupled to electrochromic devices in parallel and series arrangement.

FIG. 2G is a diagram of a driver 238 coupled to electrochromic devices 240 in parallel and series arrangement. A lower-cost system version may find this arrangement suitable. Or, multiple electrochromic devices 240 could be attached to a monolithic glass substrate to act like one larger electrochromic device. From left to right in FIG. 2G, the electrochromic devices 240 are connected in series. From top to bottom in FIG. 2G, the electrochromic devices 240 are connected in parallel. More precisely, the top left electrochromic device 240 is connected in parallel to the bottom left electrochromic device 240. The top right electrochromic device 240 is connected in parallel to the bottom right electrochromic device 240. The pair of parallel-connected electrochromic devices 240 on the left are connected in series to the pair of parallel-connected electrochromic devices 240 on the right. Variations on this arrangement are readily devised for multiple electrochromic devices in series, multiple electrochromic devices in parallel, and larger numbers of electrochromic devices in series and parallel connection. Care should be taken to match charge capacity and manufacturing parameters among electrochromic devices 240 in these types of arrangements, for best matching of tint and bleach rates and levels. From a practical standpoint, parallel drive and parallel-connected electrochromic devices 240 generally require more current overall than series-connected electrochromic devices 240 or a single electrochromic device 240. Series drive and series-connected electrochromic devices 240 generally require higher voltage overall than parallel drive and parallel-connected electrochromic devices or a single electrochromic device 240.

Figure 3:
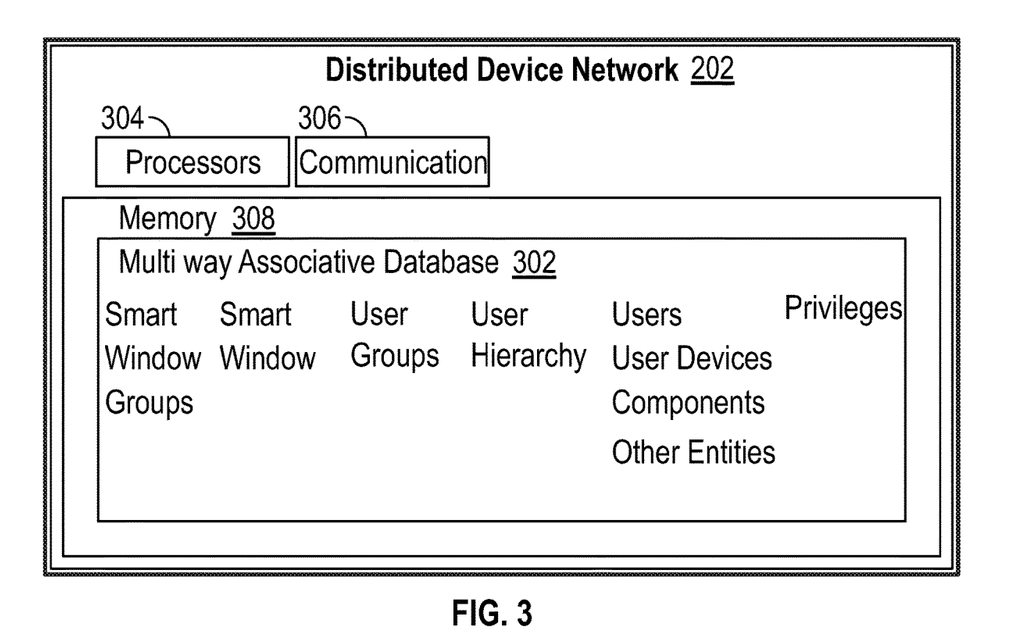
FIG. 3 shows a multiway associative database in the distributed device network, suitable for use to manage and reconfigure the smart window groups and user groups of FIG. 2A-G in a multitenant building with smart windows such as shown in FIG. 1.

FIG. 3 shows a multiway associative database 302 in the distributed device network 202, suitable for use to manage and reconfigure the smart window groups 214 and user groups 212 of FIGS. 2A-G in a multitenant building with smart windows 102 such as shown in FIG. 1. The distributed device network 202 has multiple processors 304 and communication modules 306, so that components in the distributed device network can process information and communicate and cooperate to manage the smart window groups 214, the user groups 212, and operation of the smart windows 102 in accordance with privileges in the multiway associative database 302 in memory 308. Smart windows 102 are associated with (e.g., have membership in) smart window groups 214, users are associated with (e.g., have membership in) user groups 212, and there may be a user hierarchy. Users 210 are associated with privileges, which can be associated with user groups 212, the user hierarchy, individual smart windows 102 and/or smart window groups 214, in the multiway associative database 302. In some versions, privileges are extensible, so that a user or group of users could extend or assign privileges to another user or group of users. Extensible privileges would be a privilege in and of itself, recorded in the database 302. So, for example, a given user might or might not have certain privileges, might or might not have the privilege of being able to extend privileges to another, and might or might not have the privilege of being able to grant extensible privileges to another so that the other user can extend privileges. Below are some examples for operation of the smart windows 102, in the distributed device network 202.

User A has privileges for tinting the windows of his or her office 106, as an individual, and has privileges for tinting the windows of the conference room 108, as a member of the group 212 of conference room users. User B is an office manager 224, and has an individual privilege of being able to transfer or assign user privileges to other users 210, or in variations to specific user devices (e.g., smart phones, computers, etc.), components of the smart window system (e.g., smart controllers, smart windows, wall controllers, other input devices, etc.), or other entities (e.g., an Internet of things device, machine, robot, other control system, etc.) In some embodiments, this privilege is recursive, and a user 210 to whom this privilege has been granted can assign or transfer that privilege to another user 210, who can in turn assign or transfer that privilege to another user 210. In some embodiments, the system supports voting among users 210 when there is overlapping direction from multiple users 210, each with a related privilege to tint a specified window or group of windows. The system could resolve overlapping direction for tinting a smart window 102 or group 214 of smart windows 102 by overrides according to privileges, or by averaging among user inputs, etc.

Some embodiments of the distributed device network 202 perform authentication of users 210, and administer privileges only upon authentication. For example, a user 210 could arrive at the office, authenticate on a user device, and receive privileges for operating one or more of the smart windows 102, i.e., be granted access to control of the smart windows 102. A system administrator could assign or revoke privileges, or assign or cancel membership in user groups, arrange or rearrange smart window groups, etc.

Some embodiments make use of the barcode reader application 206 in ongoing operation of the smart windows 102. A user 210 could use the barcode reader application 206 to scan a barcode of a smart window 102 and receive feedback as to whether the user 210 has privilege of operation of that smart window 102, or have that smart window 102 respond to direction from the user device 216 if the user 210 has such privilege.

Privileges could also be tied to time, calendar, a building management system (BMS), a number of overrides per user 210 or per group 212, or an energy budget for the building. For example, it may be preferable to have a certain average tinting level for the smart windows 102, or for south facing windows, during summer to minimize infrared energy being let into the building and decrease air-conditioning usage. It may be preferable to have another average tinting level for the smart windows 102, or for north facing windows, or during winter to maximize infrared energy being let into the building and decrease heating energy expenditure.

User devices 216 or other control inputs in the distributed device network 202, or components of the smart window system could have dynamic capabilities, controlling one way during one time or season and another way during another time or season or for another user 210. For example, a user device 216 could control just smart windows 102, or smart windows 102 and lighting, or smart windows 102, lighting and heating, ventilation and air conditioning (HVAC). Conceivably, even other entities such as machines and robots could have dynamic capabilities or be assigned privileges for controlling one or more smart windows 102 or groups of smart windows 102.

Figure 4:
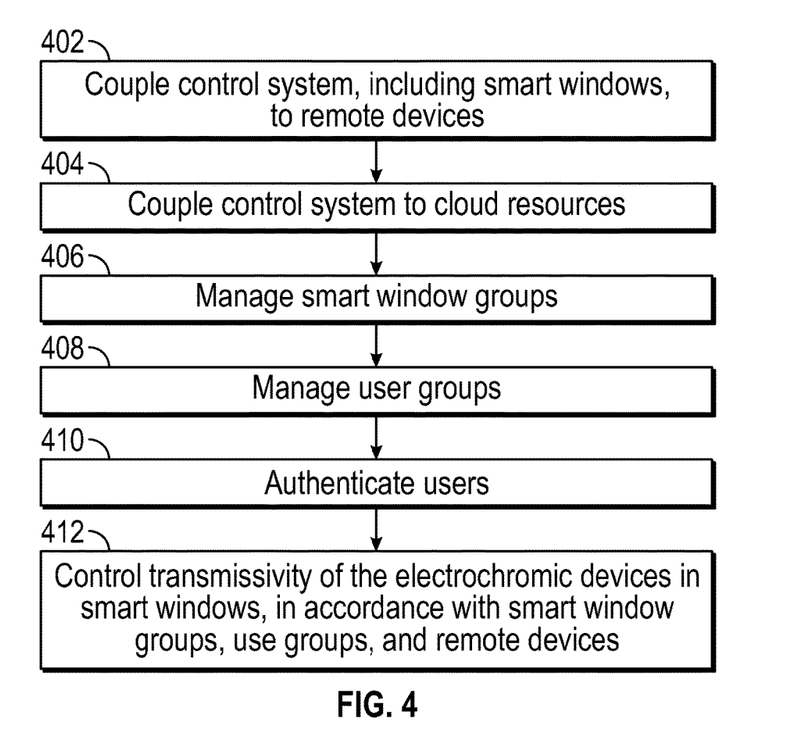
FIG. 4 is a flow diagram of a method for controlling smart windows with dynamic tenancy, which can be practiced by the smart window system shown in FIGS. 2 and 3.

FIG. 4 is a flow diagram of a method for controlling smart windows with dynamic tenancy, which can be practiced by the smart window system shown in FIGS. 2 and 3. Particularly, the method can be practiced by one or more processors in a distributed device network that includes smart windows.

In an action 402, the control system, which includes smart windows, is coupled to remote devices. These remote devices could be mobile communication devices, remote controls, various computing or communication devices, etc. In an action 404, the control system is coupled to cloud resources. For example, the control system could be coupled via a network to a smart window service. These couplings of the control system to remote devices and cloud resources form a distributed device network for control of smart windows. Smart window groups are managed, in an action 406. User groups are managed, in an action 408. A multiway associative database as described above with reference to FIG. 3 is suitable for managing the smart window groups and the user groups. User groups and individual users are associated with smart window groups and individual smart windows, and various privileges, as managed in the multiway associative database.

In an action 410, users are authenticated. Various known authentication techniques and mechanisms are suitable for user authentication. In an action 412, the transmissivity of electrochromic devices and smart windows is controlled, in accordance with smart window groups, user groups and remote devices. Such control is across the distributed device network, in some embodiments. To resolve input from multiple users and/or multiple devices, the control of the smart windows could include voting, averaging, or resolution according to privileges. Privileges are extendable or transferable among users, in some embodiments.

Figure 5:
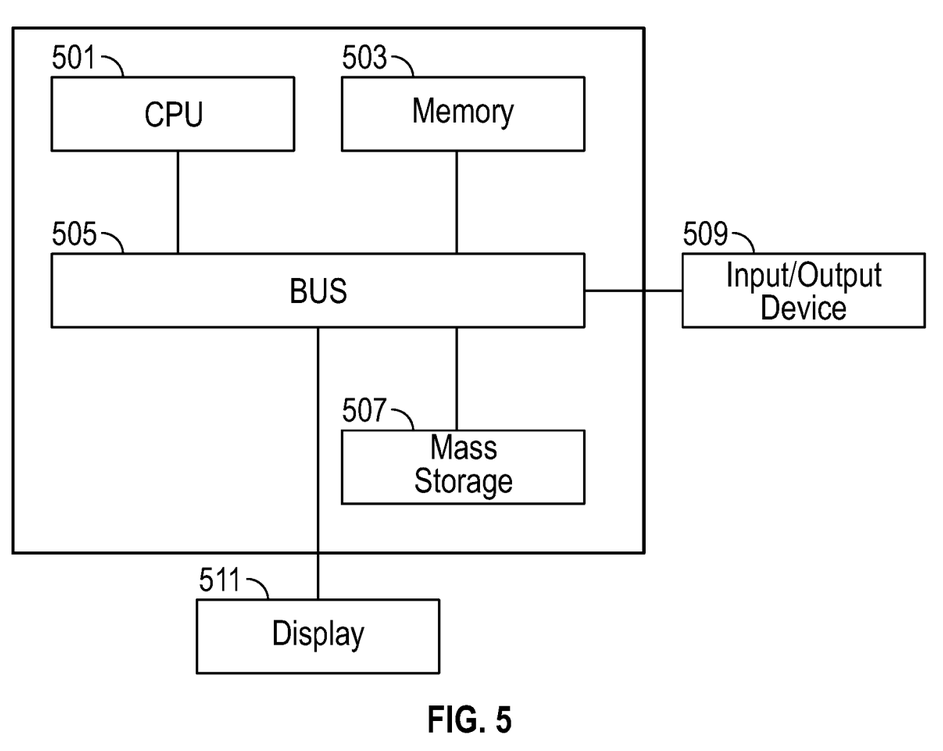
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for controlling smart windows with dynamic tenancy in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of controlling smart windows with dynamic tenancy, performed by a control system, comprising:
coupling a control system having a plurality of smart windows each having one or more electrochromic devices, to a plurality of remote devices;
managing, in the control system, configurable smart window groups each having in membership one or more of the plurality of smart windows;
managing, in the control system, configurable user groups each having in membership one or more of a plurality of users in association with the smart window groups; and
controlling transmissivity of the electrochromic devices of the plurality of smart windows in accordance with the configurable smart window groups, the configurable user groups and the plurality of remote devices.

2. The method of claim 1, further comprising:
coupling the control system to one or more cloud services, through a network; and
distributing control of the transmissivity of the electrochromic devices of the plurality of smart windows throughout one or more levels of controllers in the control system, the plurality of smart windows, the plurality of remote devices, and the one or more cloud services, as a distributed device network.

3. The method of claim 1, wherein the coupling the control system to the plurality of remote devices comprises coupling the control system to two or more devices from a group comprising mobile communication devices, personal digital assistants, personal computers, remote controls, keypads, touchpads, voice control units, wireless devices, wired devices, telephonic devices, infrared devices, sound control units, and network connectable devices.

4. The method of claim 1, further comprising:
accessing a data structure in memory in the control system, the data structure indicating the configurable smart window groups, the configurable user groups, and privileges of the users relative to the smart window groups, the user groups and the plurality of smart windows.

5. The method of claim 1, wherein the controlling the transmissivity of the electrochromic devices of the plurality of smart windows comprises voting among user inputs or averaging among the user inputs, to determine transmissivity of at least one electrochromic device that is associated with at least two overlapping smart window groups or user groups.

6. The method of claim 1, further comprising:
authenticating, in the control system, one or more users; and
administering privileges for operating the smart windows to the one or more users in accordance with group or individual privileges.

7. The method of claim 1, wherein the managing the configurable user groups comprises managing transfer or extension of user privileges from one user to another user in accordance with group or individual user privileges, for the controlling the transmissivity of the electrochromic devices of the plurality of smart windows.

8. A tangible, non-transitory, computer-readable media having instructions thereupon which, when executed by a processor, cause the processor to perform a method comprising:
cooperating with components of a control system having a plurality of smart windows each having one or more electrochromic devices, to couple to a plurality of remote devices;
cooperating with the components to manage a plurality of configurable smart window groups each associated with one or more of the plurality of smart windows;
cooperating with the components to manage a plurality of configurable user groups each associated with one or more of a plurality of users; and
cooperating with the components to control transmissivity of the electrochromic devices in accordance with the plurality of configurable smart window groups, the plurality of configurable user groups and the plurality of remote devices.

9. The computer-readable media of claim 8, wherein the method further comprises:
coupling the control system to one or more cloud services through a network, so that the one or more cloud services, one or more levels of controllers in the control system, the plurality of smart windows, and the plurality of remote devices are a distributed device network for the control of the transmissivity of the electrochromic devices.

10. The computer-readable media of claim 8, wherein the method further comprises:
managing a data structure that indicates the plurality of configurable smart window groups, the plurality of configurable user groups and privileges of the plurality of users relative to the plurality of smart window groups, the plurality of user groups and the plurality of smart windows.

11. The computer-readable media of claim 8, wherein the method further comprises:
cooperating with the components to vote among user inputs, average among user inputs, or override in accordance with privileges of users, to determine transmissivity of at least one electrochromic device that is associated with at least two overlapping smart window groups or user groups.

12. The computer-readable media of claim 8, wherein the method further comprises:
authenticating one or more of the plurality of users; and
granting access to operate the plurality of smart windows to the one or more of the plurality of users in accordance with group or individual privileges, responsive to the authenticating.

13. The computer-readable media of claim 8, wherein the method further comprises:
transferring or extending user privileges, for the control of the transmissivity of the electrochromic devices, from one user to another user in accordance with group or individual user privileges.

14. A smart window system with dynamic tenancy, comprising:
a plurality of smart windows each having one or more electrochromic devices;
a control system configurable to couple to the plurality of smart windows and to couple to a plurality of remote devices, and having at least one processor;
the control system configurable to manage configurable smart window groups each having one or more smart windows and configurable user groups each having one or more users, associated with the smart window groups; and
the control system configurable to control transmissivity of the electrochromic devices of the plurality of smart windows in accordance with the configurable smart window groups, the configurable user groups and direction from the plurality of remote devices.

15. The smart window system of claim 14, further comprising:
the control system configurable to couple to a network having cloud resources; and
the control of the transmissivity of the electrochromic devices of the plurality of smart windows is distributed throughout one or more of the cloud resources, one or more levels of controllers in the control system, the plurality of smart windows, and the plurality of remote devices, as a distributed device network.

16. The smart window system of claim 14, wherein the plurality of remote devices comprises two or more devices from mobile communication devices, personal digital assistants, personal computers, remote controls, keypads, touchpads, voice control units, wireless devices, wired devices, telephonic devices, infrared devices, sound control units, and network connectable devices.

17. The smart window system of claim 14, further comprising:
the control system configurable to manage a data structure in memory that indicates the configurable smart window groups, the configurable user groups, and privileges of the users relative to the smart window groups, the user groups and the plurality of smart windows.

18. The smart window system of claim 14, wherein the control system configurable to control the transmissivity of the electrochromic devices comprises:
the control system configurable to determine transmissivity of at least one electrochromic device that is associated with at least two overlapping smart window groups or user groups, by voting among user inputs, averaging among the user inputs, or in accordance to privileges of the users.

19. The smart window system of claim 14, further comprising:
the control system configurable to authenticate users and grant access to the users to the control of the transmissivity of the electrochromic devices in accordance with group or individual privileges.

20. The smart window system of claim 14, wherein the control system configurable to manage the configurable user groups comprises:

the control system configurable to manage transfer or extension of user privileges, relative to the control of the transmissivity of the electrochromic devices, from one user to another user in accordance with group or individual user privileges.

\* \* \* \* \*